No. 745,016. Patented November 24, 1903.

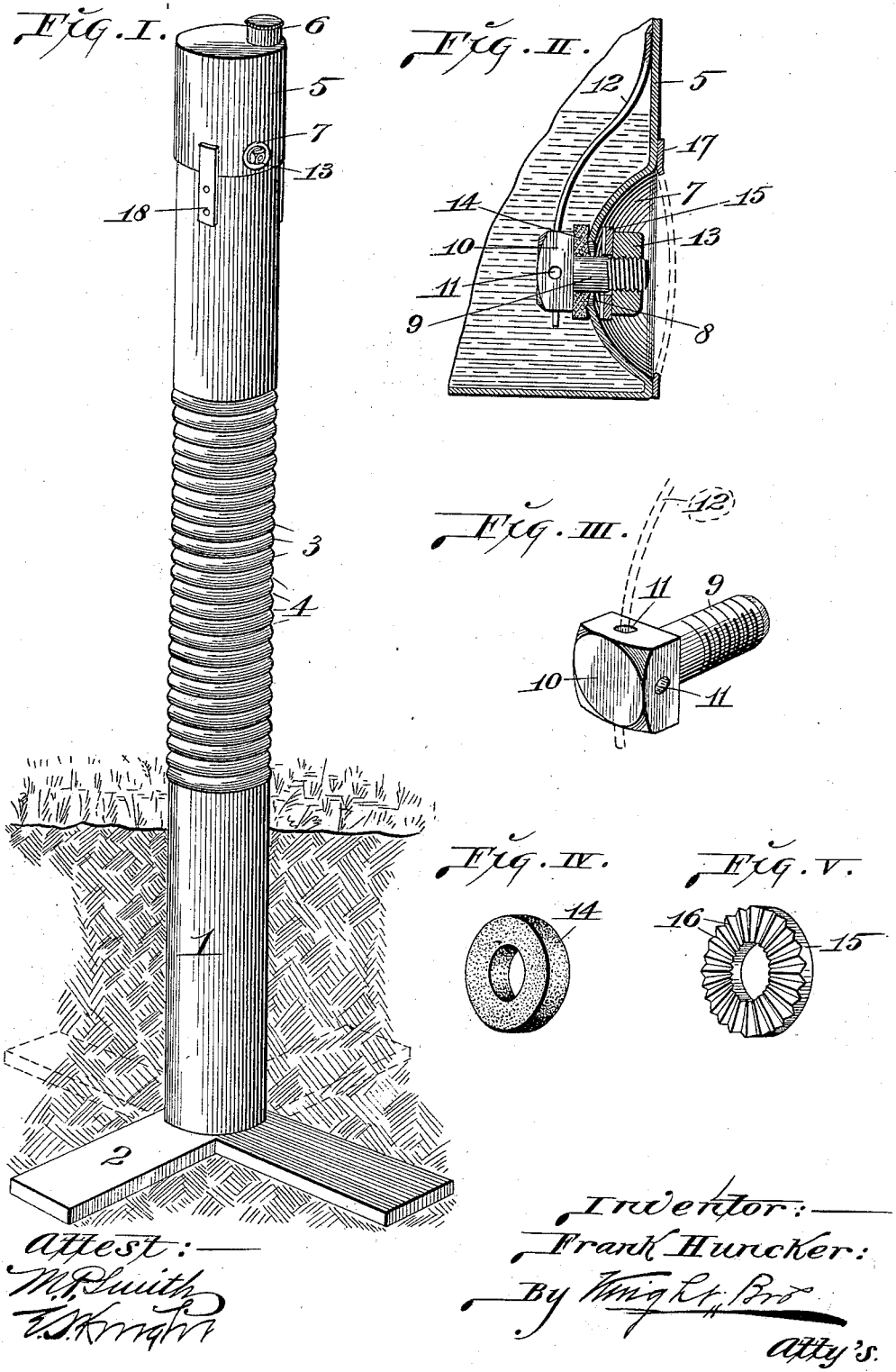

UNITED STATES PATENT OFFICE.

FRANK HUNCKER, OF SHERMAN COUNTY, NEBRASKA.

DEVICE FOR USE IN DESTROYING INSECTS.

SPECIFICATION forming part of Letters Patent No. 745,016, dated November 24, 1903.

Application filed May 6, 1903. Serial No. 155,892. (No model.)

*To all whom it may concern:*

Be it known that I, FRANK HUNCKER, a citizen of the United States, residing in Sherman county, near Ravenna, in the county of Buffalo and State of Nebraska, have invented certain new and useful Improvements in Devices for Use in Destroying Insects, of which the following is a full, clear, and exact description, reference being had to the accompanying drawings, forming part of this specification.

My invention relates to a device for use for presenting an insecticide in a manner to be received by live stock rubbing against the device without the necessity of making applications of the insecticide to the animals.

The invention consists in features of novelty hereinafter fully described and pointed out in the claims.

Figure I is a perspective view of my device. Fig. II is an enlarged vertical section of the insecticide vessel. Fig. III is a perspective view of the washer-holding bolt located in the exit-opening of the insecticide vessel. Fig. IV is a perspective view of the absorbent washer located at the vessel exit-opening. Fig. V is a perspective view of the corrugated washer located at the exterior of the vessel exit-opening.

1 designates a post which is intended to be set into the ground in a position where it will be accessible to live stock, such as hogs, horses, and cattle, the post being perfectly stayed by anchor 2. Above the ground the post is provided with a plurality of annular ribs 3, between which are present grooves 4. The insecticide, which may be of any suitable description, such as exterminating fluid sold upon the market or kerosene, is intended to flow down the post 1 from a vessel mounted upon the top of the post and from which the insecticide escapes gradually. As the insecticide flows down the post it enters the grooves 4 on flowing over the ribs 3, thereby presenting a considerable area over which the fluid is constantly presented to be imparted to an animal rubbing against the post. The natural tendency of an animal inflicted with insects, such as lice, is to rub against an object, and therefore when the animal rubs against the post bearing the insecticide it receives the insecticide on its body, with the result that the insects are killed thereby.

5 designates my insecticide vessel, which is preferably in the form of a sheet-metal can. The vessel is provided with a suitable cap 6, closing an opening in the top thereof through which the insecticide is introduced and also through which access to the interior of the vessel may be had. Near its bottom the vessel is dished inwardly, as seen at 7, Fig. II, and in the dished portion is an exit-opening 8.

9 is a bolt extending through the exit-opening 8 and having a head 10 at its inner end provided with apertures 11, extending therethrough. (See Figs. II and III.) The bolt 10 is held from rotation by a tongue 12, that is secured to the inside of the vessel-wall and the free end of which extends through one of the apertures 11 in the bolt-head.

13 is a nut applied to the screw-threaded outer end of the bolt 9.

14 designates an absorbent washer mounted on the shank of the bolt 9 within the vessel 1, where it is presented to the exit-opening 8 and held thereto by the head of the bolt. The insecticide fluid contained by the vessel 5 is absorbed by the washer 14 and gradually seeps therethrough to the exit-opening 8 to escape from the vessel and flow down the post 1, on which the vessel is mounted. The absorbent washer is held more or less tightly against the inner face of the dished portion of the vessel surrounding the exit-opening by the nut 13 and a washer 15, having a corrugated inner face 16. This washer encircles the shank of the bolt 9, and the corrugations upon its inner face furnish grooves through which the fluid insecticide may pass on its escape through the exit-opening 8, so that it may flow downwardly after escaping from the vessel and reach the post on which the vessel is mounted. When the nut 13 is tightened or loosened to compress the absorbent washer 14 or permit it to expand to regulate the passage of insecticide through said washer, the bolt is held from rotation by the tongue 12. When prepared for shipment, the vessel 5 preferably has applied to it at the location of the dished portion 7 therein a shield 17, that incloses the dished portion 7 to prevent access to the exit-opening-controlling parts while the vessel is in transit and before it is put into use. This shield is preferably of thin metal plate connected to the wall of the vessel by soft solder, so that it may be readily removed by the use of a knife or other sharp instrument. The vessel may be held to the post 1 by any suitable means, such as the straps 18. (Seen in Fig. I.) My insecticide vessel is suitable for use in other connections than upon posts, as it may be located upon any suitable support onto which the insecticide will flow from the vessel. Therefore I do not limit myself to the particular form of mounting of the vessel illustrated.

I claim as my invention—

1. In a device of the character described, the combination of a post, and an insecticide-holding vessel mounted on said post and provided with an exit-opening and means for controlling the flow of insecticide through said exit-opening, substantially as set forth.

2. In a device of the character described, the combination of a post provided with a series of ribs, and an insecticide-holding vessel mounted on said post and provided with an exit-opening and means for controlling the flow of insecticide through said exit-opening, substantially as set forth.

3. In an insecticide-holding vessel provided with an exit-opening, the combination of a bolt located in said opening, an absorbent washer mounted on said bolt at said exit-opening, and a nut on said bolt for drawing said washer toward said exit-opening, substantially as set forth.

4. In an insecticide-holding vessel provided with an exit-opening, the combination of a bolt located in said opening, an absorbent washer mounted on said bolt, a nut applied to said bolt and a corrugated washer interposed between said nut and the wall of the vessel at the exit-opening, substantially as set forth.

5. In an insecticide-holding vessel provided with an exit-opening, the combination of a bolt located in said opening, an absorbent washer mounted on said bolt, a nut applied to said bolt, a corrugated washer interposed between said nut and the wall of the vessel at the exit-opening, and a retaining-tongue secured to the wall of the vessel and passing through the head of said bolt, substantially as set forth.

FRANK HUNCKER.

In presence of—
E. S. KNIGHT,
M. P. SMITH.